US006577678B2

(12) United States Patent
Scheuermann

(10) Patent No.: US 6,577,678 B2
(45) Date of Patent: Jun. 10, 2003

(54) METHOD AND SYSTEM FOR RECONFIGURABLE CHANNEL CODING

(75) Inventor: W. James Scheuermann, Saratoga, CA (US)

(73) Assignee: Quicksilver Technology, San Jose, CA (US)

( * ) Notice: Subject to any disclaimer, the term of this patent is extended or adjusted under 35 U.S.C. 154(b) by 0 days.

(21) Appl. No.: 09/851,543

(22) Filed: May 8, 2001

(65) Prior Publication Data

US 2002/0168018 A1 Nov. 14, 2002

(51) Int. Cl.[7] ................................................. H04B 1/38
(52) U.S. Cl. ........................................ 375/222; 375/259
(58) Field of Search ................................ 375/219, 259, 375/285, 295, 222, 316; 455/418; 714/795

(56) References Cited

U.S. PATENT DOCUMENTS

| 5,635,940 | A | * | 6/1997 | Hickman et al. | ...... 342/357.17 |
|---|---|---|---|---|---|
| 5,790,817 | A | * | 8/1998 | Asghar et al. | ............... 380/270 |
| 6,091,765 | A | * | 7/2000 | Pietzold et al. | .............. 375/219 |
| 6,185,418 | B1 | * | 2/2001 | MacLellan et al. | ......... 370/200 |
| 6,192,070 | B1 | * | 2/2001 | Poon et al. | .................. 375/222 |
| 6,385,751 | B1 | * | 5/2002 | Wolf | ........................... 714/784 |

* cited by examiner

*Primary Examiner*—Don N. Vo
(74) *Attorney, Agent, or Firm*—Sawyer Law Group LLP

(57) ABSTRACT

Aspects of a reconfigurable system for providing channel coding in a wireless communication device are described. The aspects include a plurality of computation elements for performing channel coding operations and memory for storing programs to direct each of the plurality of computation elements. A controller controls the plurality of computation elements and stored programs to achieve channel coding operations in accordance with a plurality of wireless communication standards. The plurality of computation elements include a data reordering element, a linear feedback shift register (LFSR) element, a convolutional encoder element, and a Viterbi decoder element.

10 Claims, 7 Drawing Sheets

| Shift Code | Function | 7 | 6 | 5 | 4 | 3 | 2 | 1 | 0 |
|---|---|---|---|---|---|---|---|---|---|
| 000 | Zero | 0 | 0 | 0 | 0 | 0 | 0 | 0 | 0 |
| 0001 | Left 1 | i6 | i5 | i4 | i3 | i2 | i1 | i0 | 0 |
| 0010 | Left 2 | i5 | i4 | i3 | i2 | i1 | i0 | 0 | 0 |
| 0011 | Left 3 | i4 | i3 | i2 | i1 | i0 | 0 | 0 | 0 |
| 0100 | Left 4 | i3 | i2 | i1 | i0 | 0 | 0 | 0 | 0 |
| 0101 | Left 5 | i2 | i1 | i0 | 0 | 0 | 0 | 0 | 0 |
| 0110 | Left 6 | i1 | i0 | 0 | 0 | 0 | 0 | 0 | 0 |
| 0111 | Left 7 | i0 | 0 | 0 | 0 | 0 | 0 | 0 | 0 |
| 1000 | Pass | i7 | i6 | i5 | i4 | i3 | i2 | i1 | i0 |
| 1001 | Right 1 | 0 | i7 | i6 | i5 | i4 | i3 | i2 | i1 |
| 1010 | Right 2 | 0 | 0 | i7 | i6 | i5 | i4 | i3 | i2 |
| 1011 | Right 3 | 0 | 0 | 0 | i7 | i6 | i5 | i4 | i3 |
| 1100 | Right 4 | 0 | 0 | 0 | 0 | i7 | i6 | i5 | i4 |
| 1101 | Right 5 | 0 | 0 | 0 | 0 | 0 | i7 | i6 | i5 |
| 1110 | Right 6 | 0 | 0 | 0 | 0 | 0 | 0 | i7 | i6 |
| 1111 | Right 7 | 0 | 0 | 0 | 0 | 0 | 0 | 0 | i7 |

Legend: i[7:0] are the shifter's eight input bits.
i7 is the msb; i0 is the lsb.

METHOD AND SYSTEM FOR RECONFIGURABLE CHANNEL CODING

FIELD OF THE INVENTION

The present invention relates, in general, to channel coding operations, and more particularly to reconfigurable channel coding operations to accommodate various wireless communication standards.

BACKGROUND OF THE INVENTION

The use of cellular telephones in today's society has become widespread. While facilitating communication in a myriad of environments, the various existing and emerging wireless standards inhibit the ability to utilize a single device across the standards and platforms. The inability to have cross-platform coverage in a single device is due in large part to the inability to provide a hardware solution that can be adapted to varying standards.

For example, in terms of the channel coding operations that are necessary, existing and emerging wireless standards utilize myriad error mitigation techniques to operate in a hostile channel environment. Existing standards utilize two levels of coding plus block interleaving to address both single error and burst error phenomena. Group codes are used for the outer codes, and convolutional codes are used for the inner codes of the various concatenated coding schemes. No two standards employ the same combination. Additionally, certain standards employ encryption to offer a degree of privacy and security.

Utilization of an ASIC (application specific integrated circuit) approach for channel coding would be inefficient in such an environment, since there would need to have individual ASICs for supporting each possible standard. In addition, there would be an ongoing requirement to support modifications from an original design without the ability of having new silicon. A RISC (reduced instruction set computing) option is inefficient for the bit-oriented operations required for channel coding. Similarly, a DSP (digital signal processing) approach is also ill-suited to the bit-oriented requirements of channel coding. Use of a micro-programmed approach provides an arcane nature of programming and maintaining that precludes serious consideration as a solution. While FPGAs (field programmable gate arrays) do provide flexibility, the high costs, both in transistor count and control overhead, outweigh their benefits.

Accordingly, a need exists for a channel coding approach that allows convenient, efficient, and effective support across multiple standards. The present invention addresses such a need.

SUMMARY OF THE INVENTION

Aspects of a reconfigurable system for providing channel coding in a wireless communication device are described. The aspects include a plurality of computation elements for performing channel coding operations and memory for storing programs to direct each of the plurality of computation elements. A controller controls the plurality of computation elements and stored programs to achieve channel coding operations in accordance with a plurality of wireless communication standards. The plurality of computation elements include a data reordering element, a linear feedback shift register (LFSR) element, a convolutional encoder element, and a Viterbi decoder element.

With the present invention, a reconfigurable channel coder is provided that minimizes point designs, i.e., the present invention avoids designs that satisfy a singular requirement of one, and only one, wireless standard, which would render them useless for any other function. Further, bit-oriented operations of channel coding are successfully mapped onto a set of byte-oriented memory and processing elements. In addition, the present invention achieves a channel coder in a manner that provides realizability, reliability, programmability, maintainability, and understand-ability of design, while gaining savings in power and die area. Numerous other advantages and features of the present invention will become readily apparent from the following detailed description of the invention and the embodiments thereof, from the claims and from the accompanying drawings.

DETAILED DESCRIPTION OF THE INVENTION

Figure 1:
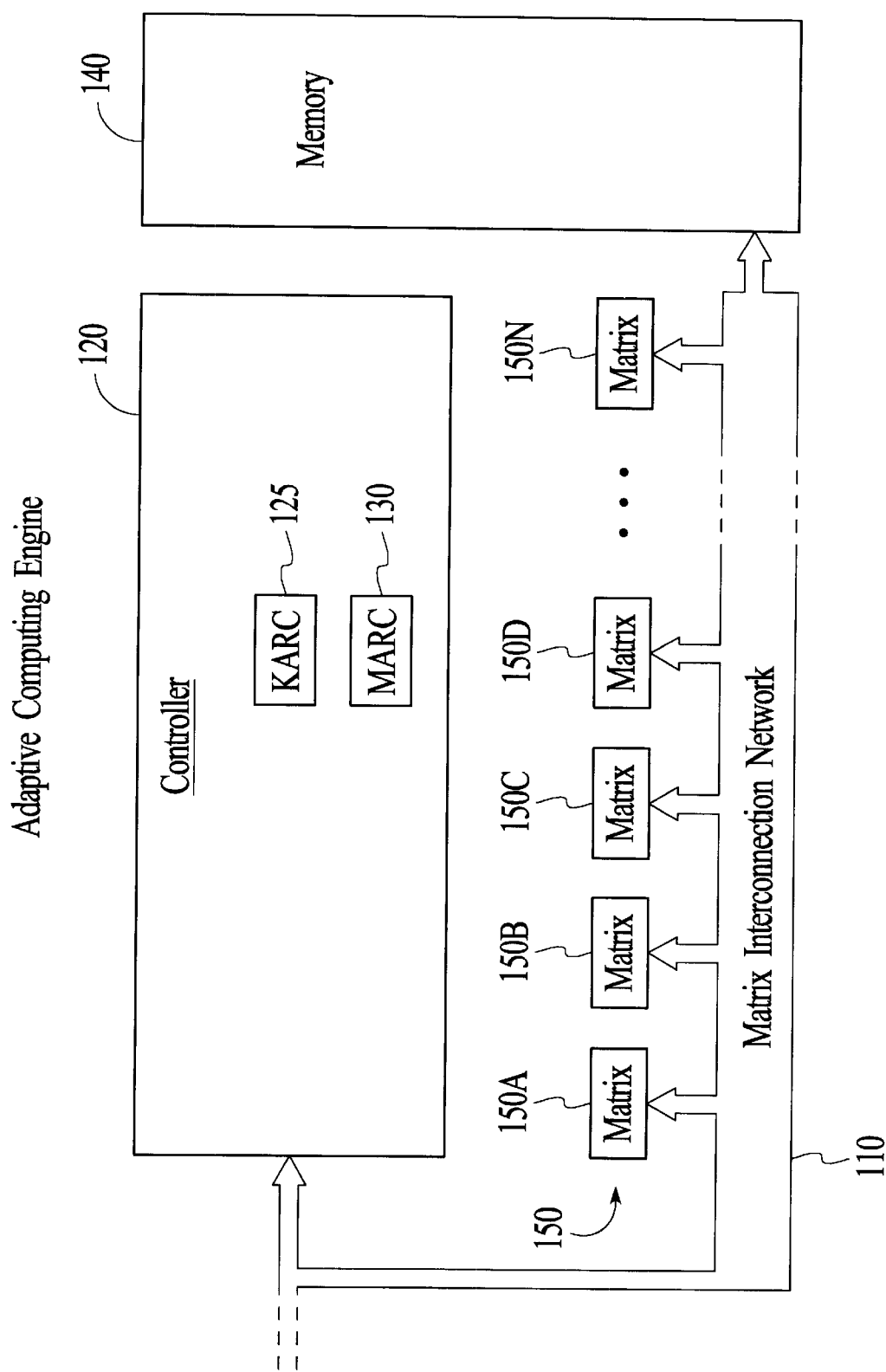
FIG. 1 is a block diagram illustrating an adaptive computing engine.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

The present invention provides aspects of a reconfigurable channel coder. In a preferred embodiment, the reconfigurable channel coder is provided as a reconfigurable matrix in accordance with the description in co-pending U.S. patent application, Ser. No. 09/815,122, entitled "Adaptive Integrated Circuitry with Heterogeneous and Reconfigurable Matrices of Diverse and Adaptive Computational Units Having Fixed, Application Specific Computational Elements," assigned to the assignee of the present invention and incorporated by reference in its entirety herein. Portions of that description are reproduced herein for clarity of presentation of the aspects of the present invention.

Referring to FIG. 1, a block diagram illustrates an adaptive computing engine ("ACE") 100, which is preferably embodied as an integrated circuit, or as a portion of an integrated circuit having other, additional components. In the preferred embodiment, and as discussed in greater detail below, the ACE 100 includes a controller 120, one or more reconfigurable matrices 150, such as matrices 150A through 150N as illustrated, a matrix interconnection network 110, and preferably also includes a memory 140.

A significant departure from the prior art, the ACE 100 does not utilize traditional (and typically separate) data and instruction busses for signaling and other transmission between and among the reconfigurable matrices 150, the controller 120, and the memory 140, or for other input/output ("I/O") functionality. Rather, data, control and configuration information are transmitted between and among these elements, utilizing the matrix interconnection network 110, which may be configured and reconfigured, in real-time, to provide any given connection between and among the reconfigurable matrices 150, the controller 120 and the memory 140, as discussed in greater detail below.

The memory 140 may be implemented in any desired or preferred way as known in the art, and may be included within the ACE 100 or incorporated within another IC or portion of an IC. In the preferred embodiment, the memory 140 is included within the ACE 100, and preferably is a low power consumption random access memory (RAM), but also may be any other form of memory, such as flash, DRAM, SRAM, MRAM, ROM, EPROM or E$^2$PROM. In the preferred embodiment, the memory 140 preferably includes direct memory access (DMA) engines, not separately illustrated.

The controller 120 is preferably implemented as a reduced instruction set ("RISC") processor, controller or other device or IC capable of performing the two types of functionality discussed below. The first control functionality, referred to as "kernal" control, is illustrated as kernal controller ("KARC") 125, and the second control functionality, referred to as "matrix" control, is illustrated as matrix controller ("MARC") 130.

The various matrices 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of computation units (200, FIG. 2), which in turn generally contain a different or varied mix of fixed, application specific computational elements (250, FIG. 2), which may be connected, configured and reconfigured in various ways to perform varied functions, through the interconnection networks. In addition to varied internal configurations and reconfigurations, the various matrices 150 may be connected, configured and reconfigured at a higher level, with respect to each of the other matrices 150, through the matrix interconnection network 110.

Figure 2:
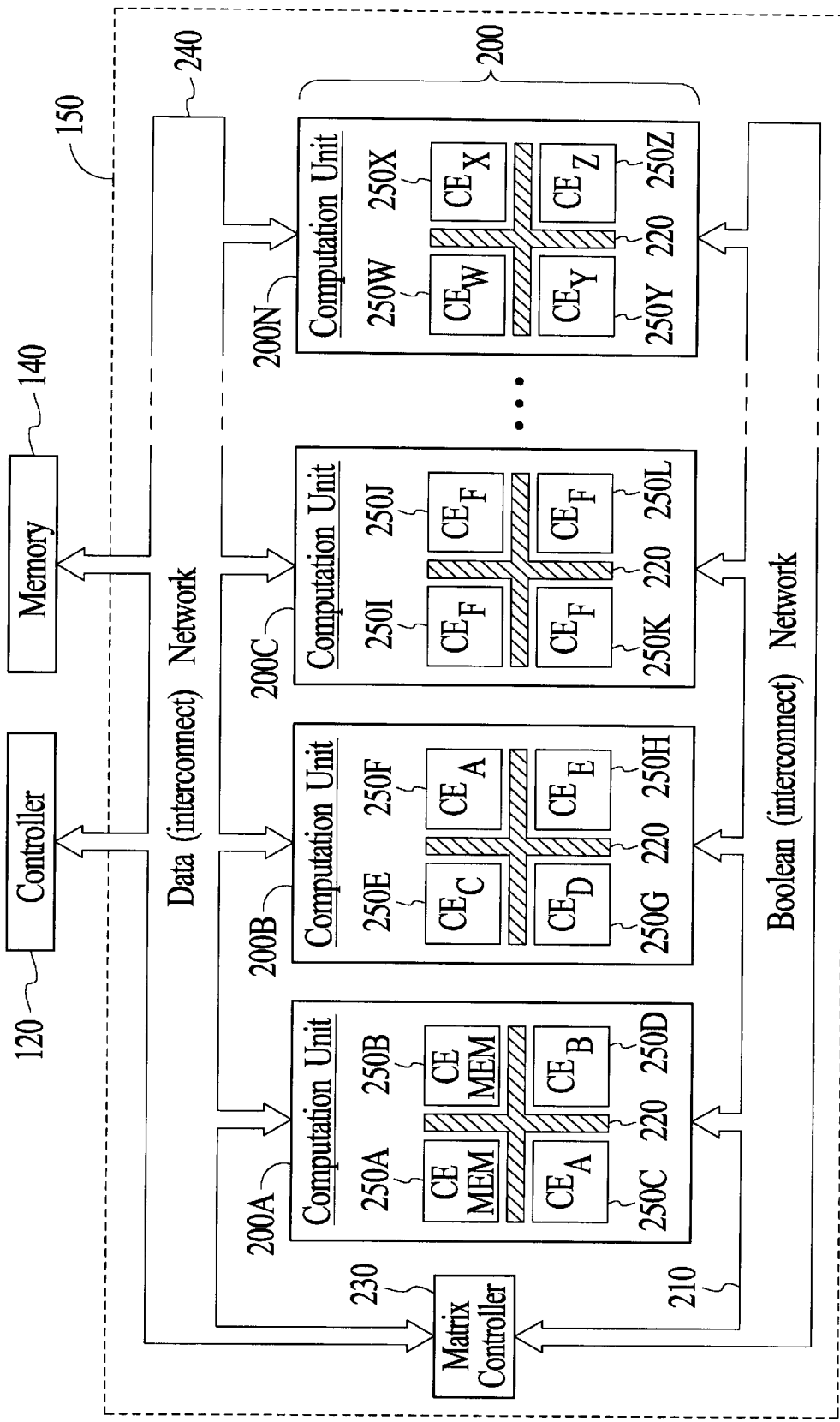
FIG. 2 is a block diagram illustrating a reconfigurable matrix, a plurality of computation units, and a plurality of computational elements of the adaptive computing engine.

Referring now to FIG. 2, a block diagram illustrates, in greater detail, a reconfigurable matrix 150 with a plurality of computation units 200 (illustrated as computation units 200A through 200N), and a plurality of computational elements 250 (illustrated as computational elements 250A through 250Z), and provides additional illustration of the preferred types of computational elements 250. As illustrated in FIG. 2, any matrix 150 generally includes a matrix controller 230, a plurality of computation (or computational) units 200, and as logical or conceptual subsets or portions of the matrix interconnect network 110, a data interconnect network 240 and a Boolean interconnect network 210. The Boolean interconnect network 210, as mentioned above, provides the reconfigurable interconnection capability between and among the various computation units 200, while the data interconnect network 240 provides the reconfigurable interconnection capability for data input and output between and among the various computation units 200. It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, or connection functionality.

Continuing to refer to FIG. 2, included within a computation unit 200 are a plurality of computational elements 250, illustrated as computational elements 250A through 250Z (collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. The fixed computational elements 250 may be reconfigurably connected together to execute an algorithm or other function, at any given time, utilizing the interconnect 220, the Boolean network 210, and the matrix interconnection network 110.

In the preferred embodiment, the various computational elements 250 are designed and grouped together, into the various reconfigurable computation units 200. In addition to computational elements 250 which are designed to execute a particular algorithm or function, such as multiplication, other types of computational elements 250 may also be utilized. As illustrated in FIG. 2, computational elements 250A and 250B implement memory, to provide local memory elements for any given calculation or processing function (compared to the more "remote" memory 140). In addition, computational elements 250I, 250J, 250K and 250L are configured (using, for example, a plurality of flip-flops) to implement finite state machines, to provide local processing capability (compared to the more "remote" MARC 130), especially suitable for complicated control processing.

In the preferred embodiment, a matrix controller 230 is also included within any given matrix 150, to provide greater locality of reference and control of any reconfiguration processes and any corresponding data manipulations. For example, once a reconfiguration of computational elements 250 has occurred within any given computation unit 200, the matrix controller 230 may direct that that particular instantiation (or configuration) remain intact for a certain period of time to, for example, continue repetitive data processing for a given application.

With the various types of different computational elements 250 which may be available, depending upon the desired functionality of the ACE 100, the computation units 200 may be loosely categorized. A first category of computation units 200 includes computational elements 250 performing linear operations, such as multiplication, addition, finite impulse response filtering, and so on. A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 2, particularly useful for complicated control sequences, dynamic scheduling, and input/output management, while a fourth type may implement memory and memory management, such as computation unit 200A. Lastly, a fifth type of computation unit 200 may be included to perform bit-level manipulation.

Figure 3:
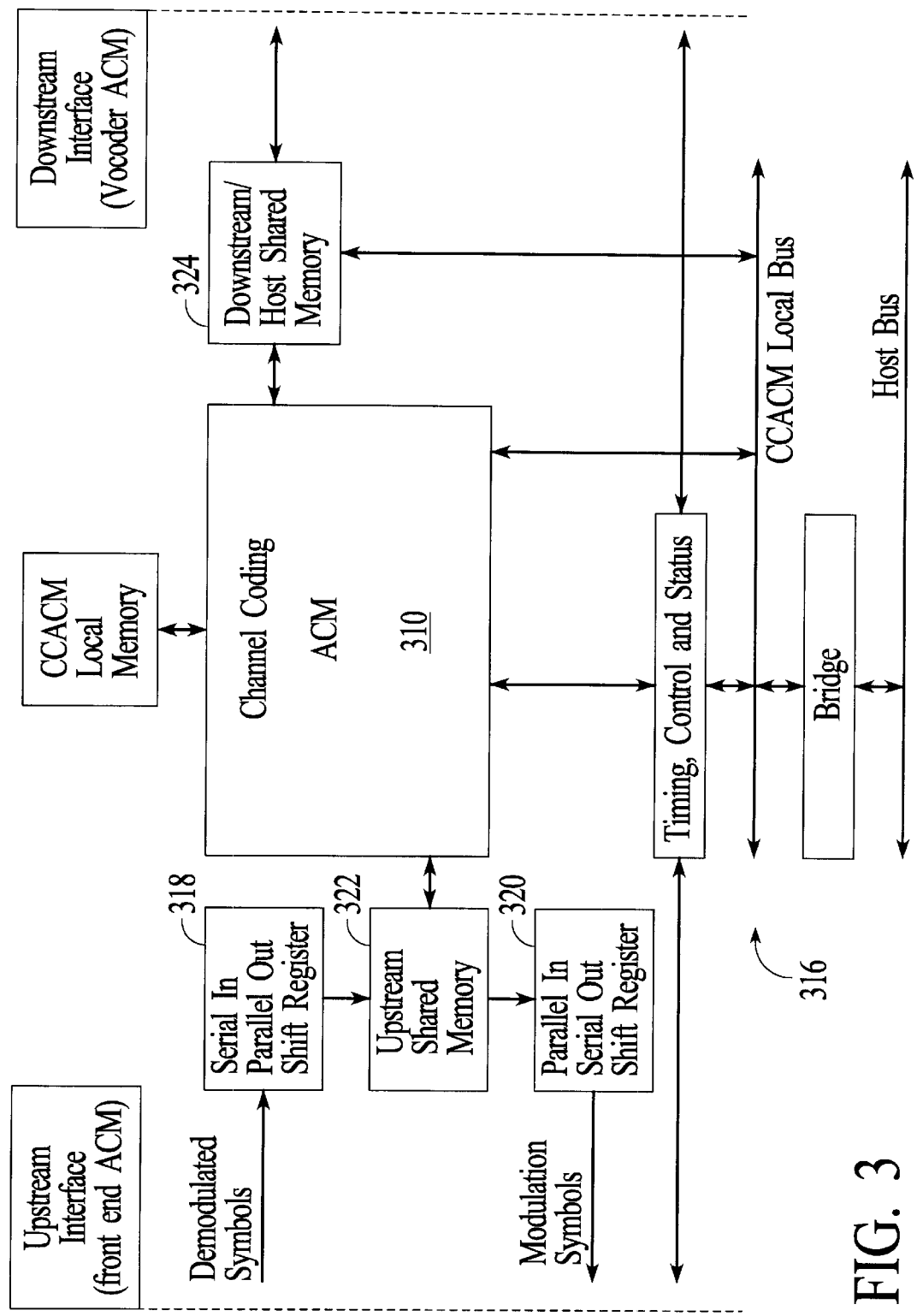
FIG. 3 illustrates a block diagram of a channel coding computation unit in accordance with the present invention.

The operations of channel coding fall within this fifth category type for computation unit 200. An overall diagram of a channel coding computation unit in accordance with the present invention that performs across standards in a flexible and reliable manner is shown in FIG. 3. The channel coding computation unit/channel coder 310 includes a plurality of configurable and/or programmable memory and processing elements and has three principle interfaces: a front end or upstream interface 312, a Vocoder or downstream interface 314, and a host interface 316. The channel coder 310 receives demodulated symbols from the RECEIVE segment of the upstream interface 312 via the shift register 318 and sends modulation symbols to the TRANSMIT segment of the upstream interface 312 via the shift register 320. Upstream shared memory 322 and downstream shared memory 324 provide ping/pong pairs of buffer memories for the data interfaces. Data blocks are transferred at a fixed rate, e.g., one block in each direction every 20 milliseconds.

For example, for the receive path, during one 20 millisecond interval, data from the front-end interface 312 is written into the receive PING buffer memory and data in the receive PONG buffer memory is processed by the channel coder 310. During the next 20 millisecond interval, data from the front-end interface 312 is written into the receive PONG buffer memory and data in the receive PING buffer memory is processed by the channel coder 310, and so on. A pair of control signals synchronizes these operations, where one indicates the beginning of each interval and the other indicates the ping/pong state. These operations are performed similarly with a second pair of buffer memories used in the transmit path.

The channel coder 310 sends speech blocks to a vocoder decoder (not shown) and receives speech blocks from a vocoder encoder (not shown) via the downstream interface 314. Again, ping/pong buffers are utilized for the transmit and receive operations via the downstream interface 314 with memory 324. Thus, for example, during one 20 millisecond interval, data from the channel coder 310 is written into a PING buffer memory and data in the PONG buffer memory is processed by the vocoder decoder. During the next 20-millisecond interval, data from the channel coder 310 is written into the PONG buffer memory and data in the PING buffer memory is processed by the vocoder decoder, and so on. Three control signals synchronizes these operations, where one indicates the beginning of each interval, a second indicates the ping/pong state, and a third indicates valid/corrupted data for the receive path only. These operations are performed similarly with a second pair of buffer memories used for the data interface between the channel coder and vocoder encoder. Continuing to refer to FIG. 3, there are several interfaces between the host controller 120 and channel coder 310 that provide the host interface 316. One supports the configuration of the channel coder 310 and another is used for control and status. The third, denoted as downstream/host shared memory 324, provides bidirectional message transfer between the channel coder's 310 physical layer and the higher protocol layers executing on the host controller 120.

For many of the channel coding operations of channel coder 310, reordering and/or randomly accessing the bits that comprise a data block are required. For example, for the GSM standard, 260 bit blocks of data are generated by the speech encoder every 20 milliseconds. These bits are manipulated three different ways before they are transmitted, as is well understood in the art. First, the most perceptually significant 50 bits from each 260 bit block must be accessed in a nearly random fashion and input to a CRC generator. Next, 182 bits from the 260 bit block, the 3 CRC bits, and four tail bits are reordered for input to a R=½ convolutional encoder. Finally, the remaining least perceptually significant 78 bits from the 260 bit block and the 378 bits from the R=½ convolutional encoder are reordered into eight 57-bit blocks, employing an interleaving algorithm for burst error mitigation.

Each of the other standards also requires data reordering operations, but the implementation details vary widely. Two general classes of reordering are required. One class can be described algorithmically, while a second class basically requires random access capability. An interleaver is an example of the former, and bit picking from the encoded speed blocks is an example of the latter. In order to achieve both classes of reordering while avoiding point solutions, the channel coder 310 of the present invention employs a look-up table approach, as described with reference to FIG. 4.

Figure 4:
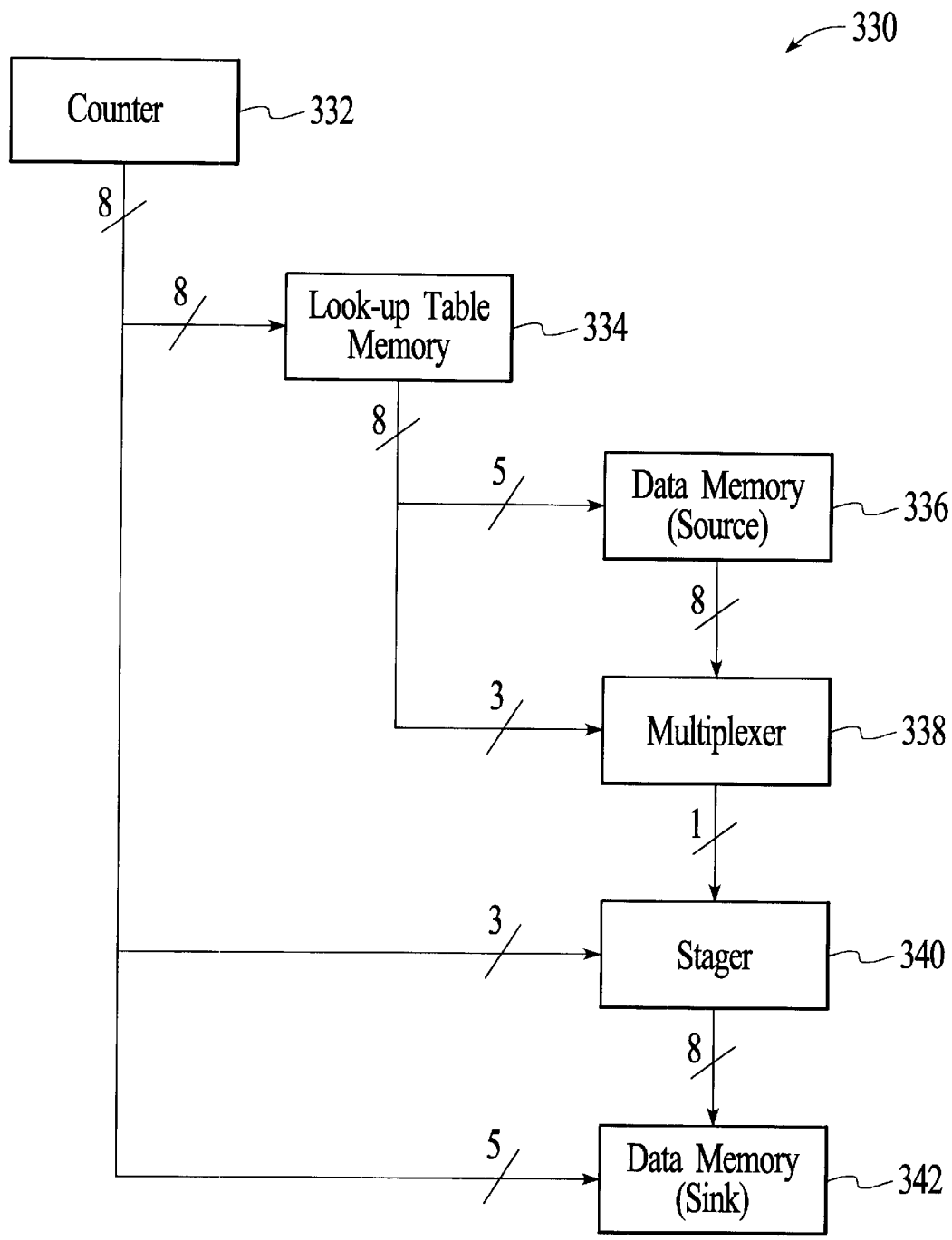
FIGS. 4–8 each illustrate aspects of computation elements of the channel coding computation unit of FIG. 3 in accordance with the present invention.

FIG. 4 illustrates an example of a reordering element 330 as a computation element of the channel coder 310 in accordance with the present invention. The byte-wide organization supports arbitrary reordering of 256-bit data blocks. In operation, an up counter 332 is incremented from 0 to N−1, where N represents the length of the data vector. For this example, Nmax is 256. For each count, the look-up table memory 334 outputs an encoded byte that contains the location of the desired bit in the 32-byte source data memory 336. Five bits specify the byte memory address and three bits indicate the desired 1-of-8 data bits from multiplexer 338. The desired bit is stored in the stager 340, e.g., an 8-bit serial-in, parallel-out shift register. The staged bytes are written sequentially into the 32-byte sink data memory 342.

Of course, the reordering element 330 also supports random access operations. For example, the GSM standard requires the random access of 50 bits of encoded speech deemed most perceptually significant for the purpose of generating CRC protection. For random access operations, however, data is not moved from a source memory 336 to a sink memory 342. Thus, only the top four blocks 332, 334, 336, and 338 are required.

While the reordering element 330 has been described in terms of 256-bit data block size, in order to handle data blocks larger than 256 bits, the look-up table width has to be greater than eight bits. An extension of the look-up table memory width would accommodate a greater width. Alternatively, two bytes could be processed per bit.

In addition to reordering data, channel coding schemes normally include error detecting cyclic codes, error detecting and correcting Hamming codes, single burst error correcting Fire codes, and so on. Typically, these codes are represented by their generator polynomials. The degree of polynomials used for the various wireless standards spans a wide range, from degree 3 for a GSM CRC, to degree 42 for the CDMA long code, to effective degrees of 64 and 128 for the GSM and Bluetooth ciphers, respectively. While separate encoders and decoders can be implemented for each of these standards utilizing linear feedback shift registers (LFSRs), the channel coder 310 implements a programmable special purpose computational element to perform the operations of a LFSR that accommodates the various standards as needed. Normally, LSFRs are bit-oriented structures which combine shift register stages and mod-2 adders. The present invention provides a programmable, byte-oriented structure, as represented in the block diagram of FIG. 5.

By way of example, the generator polynomial used for GSM (224, 184) Fire code is $g(x)=x^{40}+x^{26}+x^{23}+x^{17}+x^3+1$. A block of 184 bits is protected by 40 extra parity bits used for error detection and correction. These bits are appended to the 184 bits to form a 224 bit sequence. In order to map bit-oriented encoder operations onto the byte-oriented LFSR element of the present invention, the processing of eight information bits at one time and the computing the LFSR state after eight consecutive shifts are required.

Figures 5, 6:
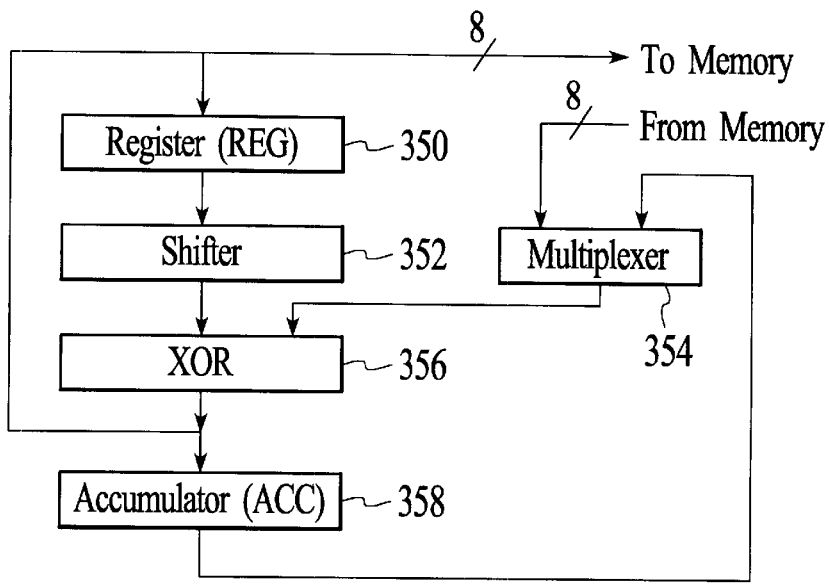

Referring now to FIG. 5, a byte-oriented memory (not shown) contains the information bytes, with five bytes representing the forty bit LFSR data. For the structure shown in FIG. 5, the feedback byte is computed and stored in a register (REG) 350, while the computation occurs through the use of a shifter 352, multiplexer 354, exclusive-OR gate (XOR) 356, and accumulator (ACC) 358 in accordance with the following pseudo code. In the notation used, REG_R(k) represents a logical right shift of the feedback byte by k positions for k=1 to 7, while REG_L(k) represents a logical left shift of the feedback byte by k positions for k=1 to 7. The information byte is represented as d[0:7], and the five LSFR bytes are represented with LSFR[39:32], LFSR[31:24], LFSR[23:16], LFSR[15:8], and LFSR[7:0]. The sixteen possible outputs from the shifter element 352 are represented in FIG. 6. The LSFR values are set to zero for the first iteration.

1. Compute the Feedback Byte
(e.g.,
REG←d[0:7]
REG←REG⊕LFSR[39:32])
2. Update the five LFSR bytes
(e.g.,
ACC←LFSR[31:24]
LFSR[39:32]←ACC⊕REG_R(6)
ACC←LFSR[23:16]←REG_R(7)
ACC←ACC⊕REG_R(1)
LFSR[31:24]←ACC⊕REG_L(2)
ACC←LFSR[15:8]⊕REG_L(1)
LFSR[23:16]←ACC⊕REG_L(7)
ACC←LFSR[7:0]⊕REG_R(5)
LFSR[15:8]←ACC
ACC←REG
LFSR[7:0]←ACC⊕REG_L(3))
3. Repeat routine as needed
(e.g.,
The routine is repeated 23 times to process the 184 information bits (23 information bytes).)

In addition to LSFR operations, the channel coder 310 also performs the processing necessary for the various wireless standards that employ convolutional codes for the inner codes of their concatenated coding schemes. Typically, a convolutional encoder will be represented by its constraint length (k), rate (R=m/n, denoting the encoding of 'm' message symbols into 'n' coded symbols, and generator polynomials that describe the connections between a k-stage shift register and modulo-2 adders, as is well understood in the art.

Figure 7:
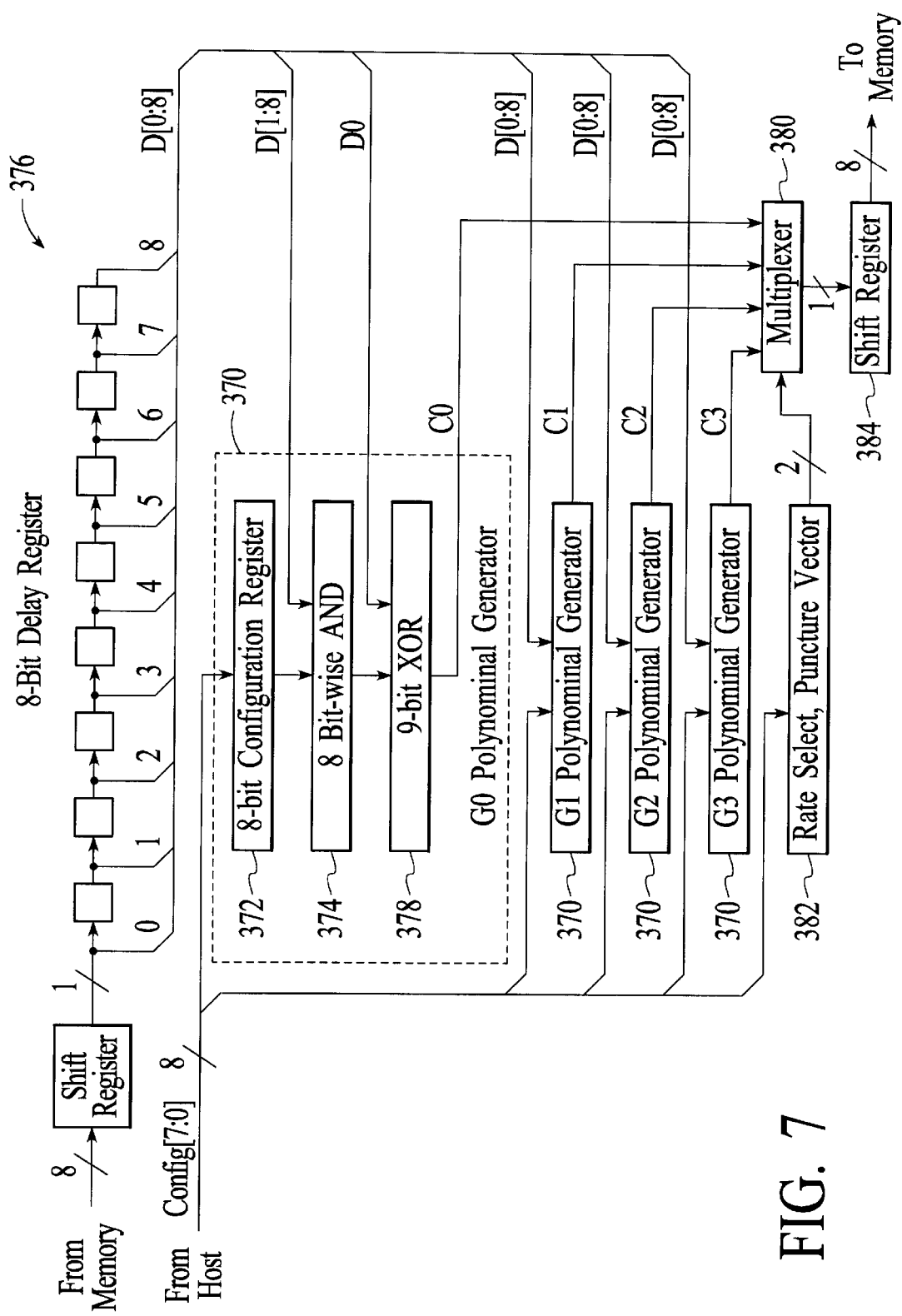

In accordance with the present invention, a byte-oriented, special purpose computational element interfaced to a byte-wide memory and a simple load/store-type programming model performs the encoding function for all of the convolutional codes identified below in the channel coder 310. FIG. 7 illustrates the convolutional encoder element in accordance with the present invention that can perform encoding functions for convolutional codes, including:

the GSM standard rate ½, constraint length $G0=1+D^3+D^4$ $G1=1+D+D^3+D^4;$ the IS-136 TDMA rate ½, constraint length 6

$G0=1+D+D^3+D^5$ $G1=1+D^2+D^3+D^4+D^5;$ the IS-136 TDMA rate ¼, constraint length 6

$G0=1+D+D^3+D^4+D^5$ $G1=1+D+D^2+D^5$ $G2=1+D+D^2+D^3+D^5$ $G3=1+D^2+D^4+D^5;$ the IS-95 CDMA rate ⅓ constraint length 9

$G0=1+D^2+D^3+D^5+D^6+D^7+D^8$ $G1=1+D+D^3+D^4+D^7+D^8$ $G2=1+D+D^2+D^5+D^8;$ and the IS-95 CDMA rate ½, constraint length 9

$G0=1+D+D^2+D^3+D^5+D^7+D^8$ $G1=1+D^2+D^3+D^4+D^8.$

As shown in FIG. 7, the convolutional element supports these convolutional codes through polynomial generators 370, each of which includes a configuration register 372 that receives configuration data from the host controller 120, provides that data to an AND component 374 for logical combination with delay data from a delay register 376, the result of which gets logically combined with the delay data via an XOR component 378. Selection of an appropriate output from the polynomial generators 370 is performed via a multiplexer 380 controlled by a rate selector 382. The output of the multiplexer 380 then gets shifted via a shift register 384 and sent to memory. With the convolutional encoder shown in FIG. 7, the channel coder 310 of the present invention supports all rate ½, ⅓, and ¼ convolutional codes, any constraint length up to k=9, and arbitrary puncturing.

These convolutional codes are decoded usually with a simple iterative process known as the Viterbi algorithm, where a Viterbi decoder determines the encoder state using a maximum likelihood technique. To determine the encoder state, the Viterbi algorithm normally generates a set of $2^{(k-1)}$ state metrics that measure the occurrence probability for each of the $2^{(k-1)}$ possible encoder states. As the state metrics are computed, a decision is formed for each of the $2^{(k-1)}$ possible states to determine the probable path taken to arrive at that particular state. These decisions are stored in a path memory that is traced backward to generate the decoded output.

A Trellis structure is a common method for representing a convolutional encoder's state transitions over time. The convention is that an input '0' corresponds to the selection of the upper branch, and an input '1' corresponds to the selection of the lower branch. Each possible input sequence corresponds to a particular path through the trellis.

The Viterbi algorithm compares the two paths entering each node and retains only the path with the better metric. The other path is discarded, since its likelihood never can exceed that of the retained path no matter what data are subsequently received. The retained paths are called survivors.

Commonly, the computational element of a Viterbi decoder is called an Add-Compare-Select (ACS) unit, since it consists of adders, comparators, and selectors. It is used to update a set of path metrics for the surviving hypotheses by adding appropriate branch metrics to the path metrics of the precursor hypotheses.

Figure 8:
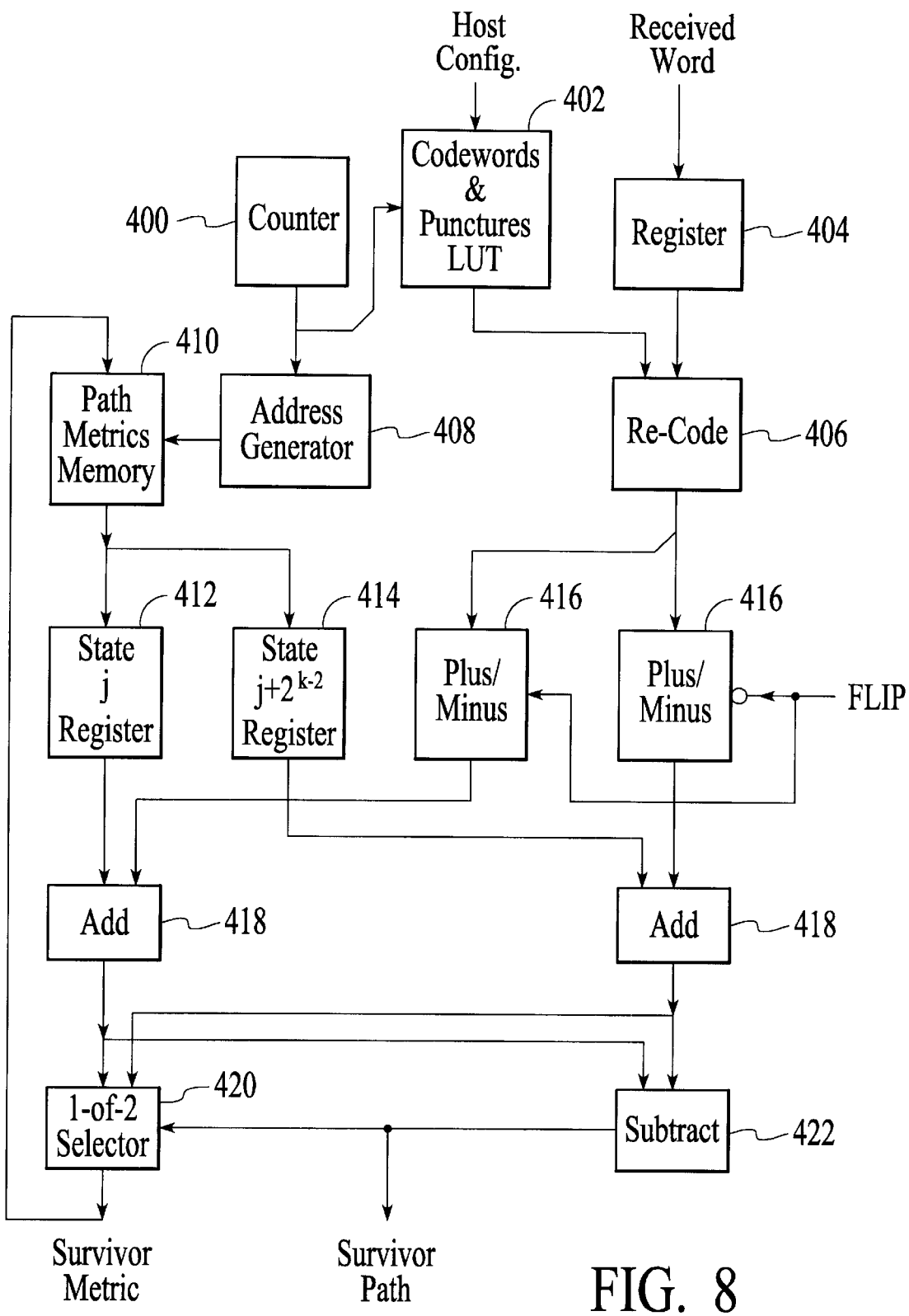

A block diagram of a Viterbi decoder computation element of channel coder 310 in accordance with the present invention is illustrated in FIG. 8. As illustrated, the Viterbi decoder element includes a counter 400, codeword and punctures look-up table (LUT) 402, register 404, recode logic 406, an address generator 408, path metrics memory 410, state registers 412 and 414, plus/minus adjusters 416, adders 418, selector 420, and comparator 422. In operation, these components of the Viterbi decoder computation element compute pairs of survivor path metrics by adding appropriate branch metrics to pairs of precursor path metrics. The sums are compared, and the better (lower) results are selected. The element performs the memory-to-memory, in-place algorithm. Survivor path bits are aggregated into bytes, stored in byte memory, and subsequently backward path-traced to generate the decoder output.

For the branch metrics, the Hamming distance between the received word and the code words, i.e., the sums of the bit-wise mismatches between the received words and the code words, are used. For rate ½, ⅓, and ¼ codes, received words and code words will consist of two, three, and four bits, respectively. For punctured codes, stored tables are used to indicate the punctured bits that are disregarded in the branch metric computation.

The range of the branch metrics (mb) is 0 to 4. For a maximum code constraint length of k=9, the maximum metric range need not exceed mb·(k−1)=4×8=32. Using eight bit two's complement arithmetic, the branch metrics range can be increased, if necessary, as is well appreciated by those skilled in the art.

With the Viterbi decoder shown in FIG. 8 along with the other computational elements described with reference to FIGS. 4–7, the channel coder of FIG. 3 is realized in a manner that achieves the ability to be reconfigured and adapted, as needed, to various wireless standards and their different approaches to channel coding operations. From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A reconfigurable system for providing channel coding in a wireless communication device comprising:

a plurality of computation elements for performing channel coding operations;

memory for storing programs to control each of the plurality of computation elements; and a controller for controlling the plurality of computation elements and stored programs to achieve channel coding operations in accordance with a plurality of wireless communications standards, wherein the plurality of computational elements further comprises a data reordering element, wherein the plurality of computation elements further comprises a linear feedback shift register (LFSR) element, wherein the plurality of computation elements further comprises a convolutional encoder element, wherein the convolutional encoder further comprises an input shift register, a delay register, a plurality of polynomial generators, a rate selector means, a multiplexer, and an output shift register.

2. The reconfigurable system of claim 1 further comprising a host controller for reconfiguring the channel coding by providing programs that update the stored programs to accommodate a change in the wireless standard.

3. The reconfigurable system of claim 1 wherein each of the plurality of computation elements further comprises a finite state machine.

4. The reconfigurable system of claim 1 wherein the data reordering element further comprises a counter, a look-up table, a data input source, a multiplexer, a stager, and a data output source.

5. The reconfigurable system of claim 1 wherein the LFSR element further comprises a register, a shifter, a multiplexer, an exclusive-OR logic means, and an accumulator.

6. The reconfigurable system of claim 5 wherein the LFSR element operates in a byte-oriented manner.

7. The reconfigurable system of claim 1 wherein each of the plurality of polynomial generators further comprises a configuration register, an AND logic means, and an exclusive-OR logic means.

8. The reconfigurable system of claim 7 wherein the convolutional encoder operates in a byte-oriented manner.

9. The reconfigurable system of claim 1 wherein the plurality of computation elements further comprises a Viterbi decoder element.

10. The reconfigurable system of claim 9 wherein the Viterbi decoder element further comprises a coupled configuration of a counter, a codeword and punctures look-up table, a register, recode logic, an address generator, path metrics memory, state registers, plus/minus adjusters, adders, a selector, and a comparator.

* * * * *